(12) United States Patent
Takahashi et al.

(10) Patent No.: US 7,088,081 B2
(45) Date of Patent: Aug. 8, 2006

(54) HIGH FREQUENCY PARTIAL BOOST POWER FACTOR CORRECTION CONTROL CIRCUIT AND METHOD

(75) Inventors: Toshi Takahashi, Rancho Palos Verdes, CA (US); Yong Li, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/165,939

(22) Filed: Jun. 24, 2005

(65) Prior Publication Data

US 2005/0285583 A1    Dec. 29, 2005

Related U.S. Application Data

(60) Provisional application No. 60/583,752, filed on Jun. 28, 2004.

(51) Int. Cl.
G05F 1/56    (2006.01)

(52) U.S. Cl. ............... 323/222; 323/284; 323/285; 323/301

(58) Field of Classification Search ............... 323/207, 323/222, 283, 284, 290, 301, 351, 285
See application file for complete search history.

(56) References Cited

U.S. PATENT DOCUMENTS 5,349,284 A * 9/1994 Whittle ............... 323/207
5,359,276 A * 10/1994 Mammano ............... 323/207
6,580,253 B1 * 6/2003 Kanakubo et al. ............... 323/222

* cited by examiner

*Primary Examiner*—Jessica Han
(74) *Attorney, Agent, or Firm*—Ostrolenk, Faber, Gerb & Soffen, LLP

(57) ABSTRACT

A circuit for providing power factor correction comprising a boost converter circuit having a boost inductance and a power factor correction switch coupled in series with the boost inductance, the boost inductance and power factor correction switch being coupled across the output of a rectifier being supplied with AC power from an AC line, the boost converter circuit further comprising a boost diode coupled to a junction between the inductor and the switch, an output of the boost diode coupled to an output capacitor, a DC bus voltage being provided across the output capacitor, further comprising a control circuit receiving as inputs a rectified AC input voltage from the rectifier, a signal proportional to current through the inductor and the DC bus voltage across the capacitor, and wherein the control circuit provides a pulse width modulated signal to control the on time of the PFC switch, further comprising an enable/disable circuit receiving as inputs the rectified AC input voltage and the DC bus voltage, the circuit instantaneously comparing the rectified AC input voltage and the DC bus voltage and controlling the control circuit whereby the control circuit provides the pulse width modulated signal to control the PFC switch when the rectified AC input voltage is less than the DC bus voltage and disables the generation of the pulse width modulated signal to the PFC switch when the rectified AC input voltage is greater than DC bus voltage.

6 Claims, 5 Drawing Sheets

The high-frequency partial PFC control diagram.

PFC Control Block

Conceptual control timing of the high-frequency partial PFC.

Test Waveforms of the conventional active high-frequency Full boost PFC.

The high-frequency partial PFC control diagram.

Test waveforms of the invented high-frequency partial PFC under an FPGA-based digital platform.

HIGH FREQUENCY PARTIAL BOOST POWER FACTOR CORRECTION CONTROL CIRCUIT AND METHOD

CROSS-REFERENCE TO RELATED APPLICATIONS

This application claims the benefit and priority of Provisional Application Ser. No. 60/583,752 filed Jun. 28, 2004, entitled A NEW HIGH-FREQUENCY PARTIAL BOOST POWER-FACTOR-CORRECTION CONTROL METHOD, the entire disclosure of which is hereby incorporated by reference herein.

BACKGROUND OF THE INVENTION

The present invention relates to power factor correction circuits, that is, circuits for reducing the distortion and harmonics generated in a power line feeding a power supply, and in particular a switched mode power supply. Power factor correction (PFC) circuits are utilized to reduce harmonics on power lines and in particular, make the circuit, including the attached load, appear to be a substantially purely resistive load. The aim of power factor correction circuits is to ensure that the AC voltage and current are substantially in phase. This improves efficiency and at the same time eliminates the generation of harmful harmonics.

Figure 1:
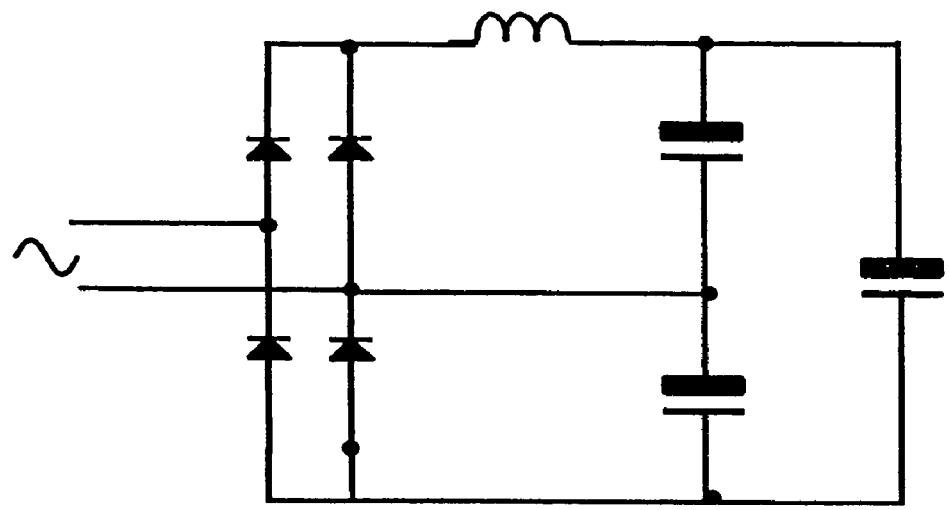

In the past, passive solutions as shown in FIG. 1 have been employed. An inductor is provided at the output of the rectifier. Because the inductor operates at the line frequency, the physical size and inductance size are normally very large, requiring high costs and increasing size of the circuit. The input current waveform is smoothed, but typically does not meet today's regulation requirements.

Figure 2:
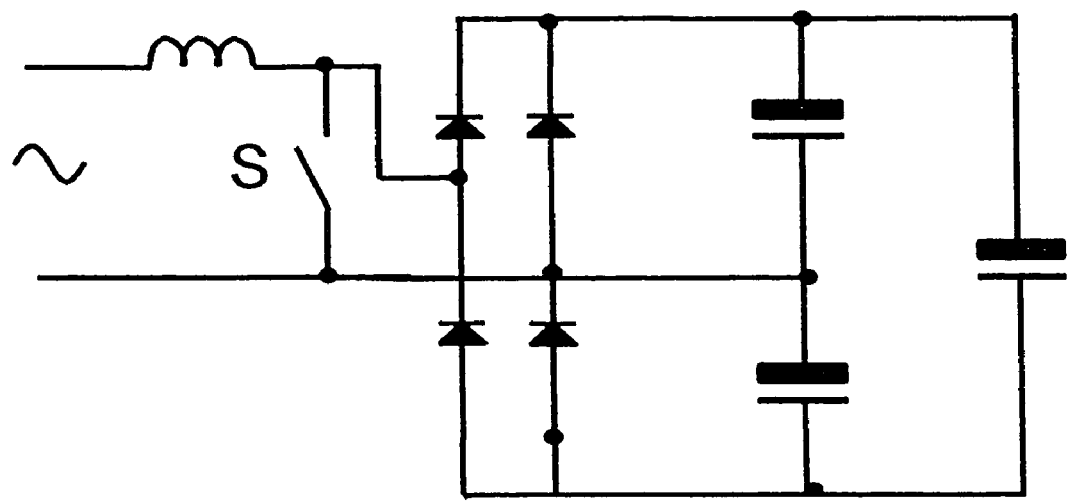

FIG. 2 shows another prior art approach that provides an active solution wherein a controllable switch S is added together with a series inductor ahead of the rectifier. This switch is turned on for a short time period every half cycle of the line frequency, for example, 120 Hz or 100 Hz. Manufacturers use this method to smooth the input current which may satisfy some applicable regulation standards, in particular in Japan, but may not meet the strict IEC standard for the European markets. Also the inductor operates at the line frequency and its physical size and inductance are still large, resulting in still high costs and circuit size.

Figure 3:
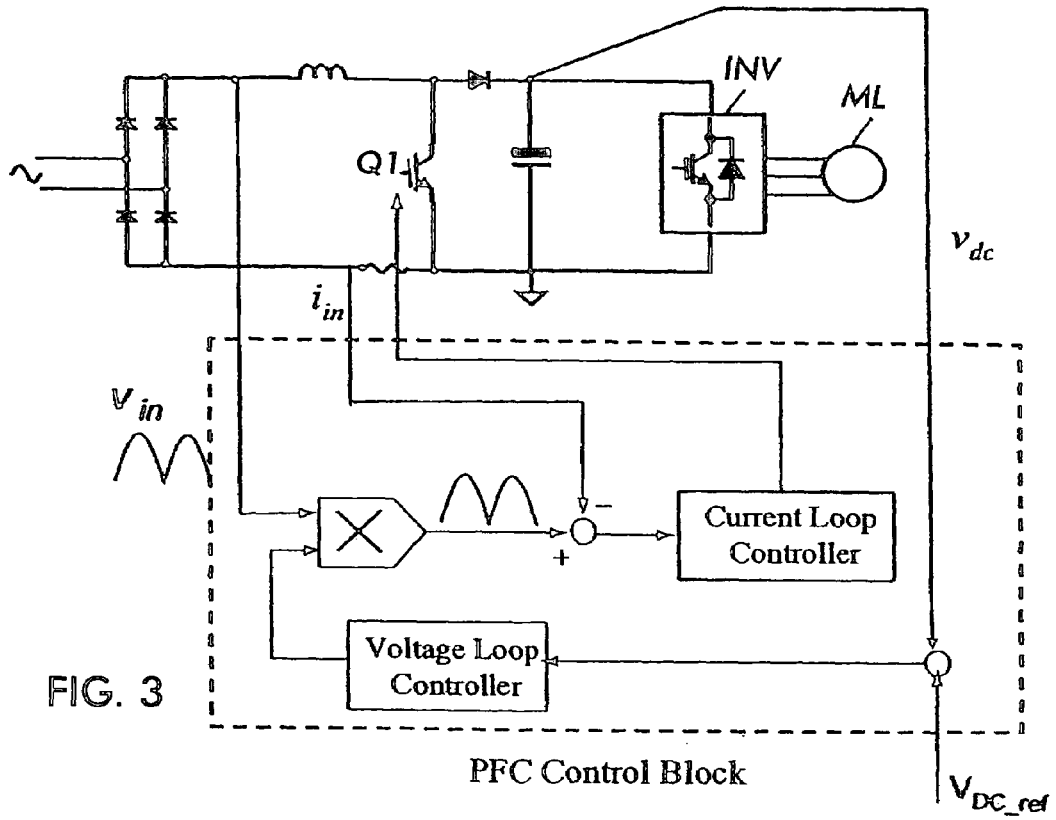

A third approach is another active solution which uses high frequency full boost power factor correction. This is the most popular PFC control method and is shown in FIG. 3 providing DC voltage to a motor drive inverter INV driving a motor ML. A switch, for example an IGBT $Q_1$, is switched at high switching frequency normally in the 50 KHz to 100 KHz range. It can achieve nearly 100% power factor which actually exceeds most regulation standards. Because of the high frequency PWM, it requires a small physical size inductor and a small size inductance. However, even this circuit has drawbacks. In particular, the high frequency PWM switching causes high switching losses, less efficiency and creates electromagnetic interference (EMI) noise and 100% PFC may be more than is necessary for many design applications.

Figure 4:
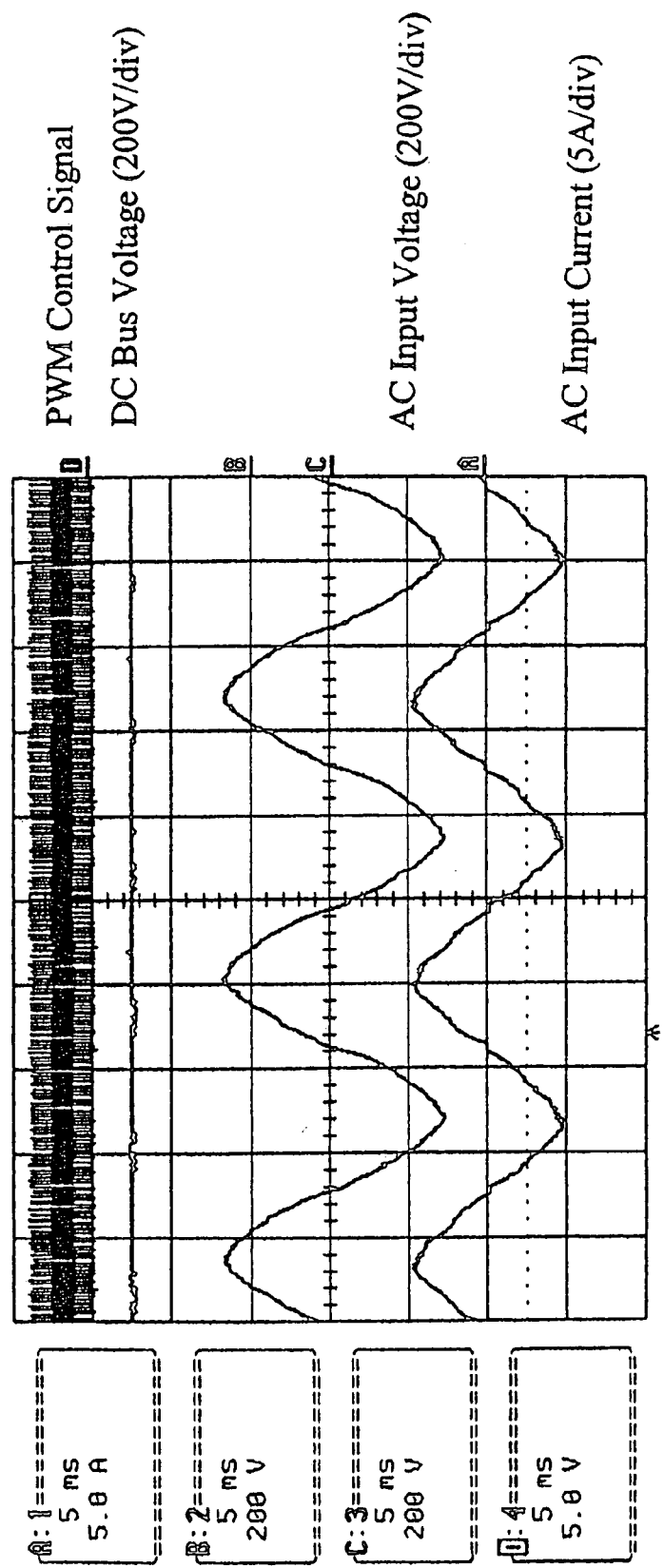

An aim of the present invention is to meet applicable regulation standards but not necessarily exceed such standards thereby to trade off power factor for reduced losses and increased efficiency by reducing switching losses and noise generation. FIG. 4 shows waveforms of the conventional active high frequency full boost PFC circuit shown in FIG. 3.

SUMMARY OF THE INVENTION

The invention provides an alternative PFC circuit and method. Depending on the regulation requirements, tradeoffs can be made between PFC performance (power factor and harmonic generation) and switching losses and efficiency. This method uses a similar circuit topology as the conventional high frequency boost PFC circuit shown in FIG. 3, but with a different control concept.

According to the invention, a partial boost PFC is employed which instantaneously compares the AC input voltage with the DC bus voltage and, on top of the active boost PFC control loop, enables and disables the PFC PWM switching for a certain period of each line cycle. When the input voltage is less than the DC bus voltage, the generation of PWM switching signals is enabled and the switch is switched at high frequency, for example at 50 KHz. Due to the high bandwidth current loop, the input current is built up in the shape of a sinusoidal reference which is generated by the voltage loop. When the input voltage is greater than the DC bus voltage, the generation of PWM switching signals is disabled. Relying on the difference between the input voltage and the DC bus voltage, both the rectifier and PFC diode will still conduct, and input current continuously flows. In this partial PFC operation, the closed loop current control is maintained during the period when the PWM switching is enabled and globally closed voltage loop control is maintained.

BRIEF DESCRIPTION OF THE DRAWING(S)

Figure 6:
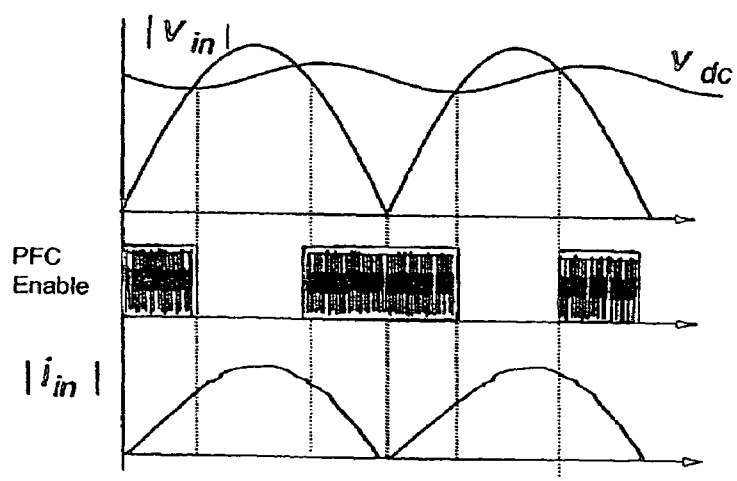
Figure 5:
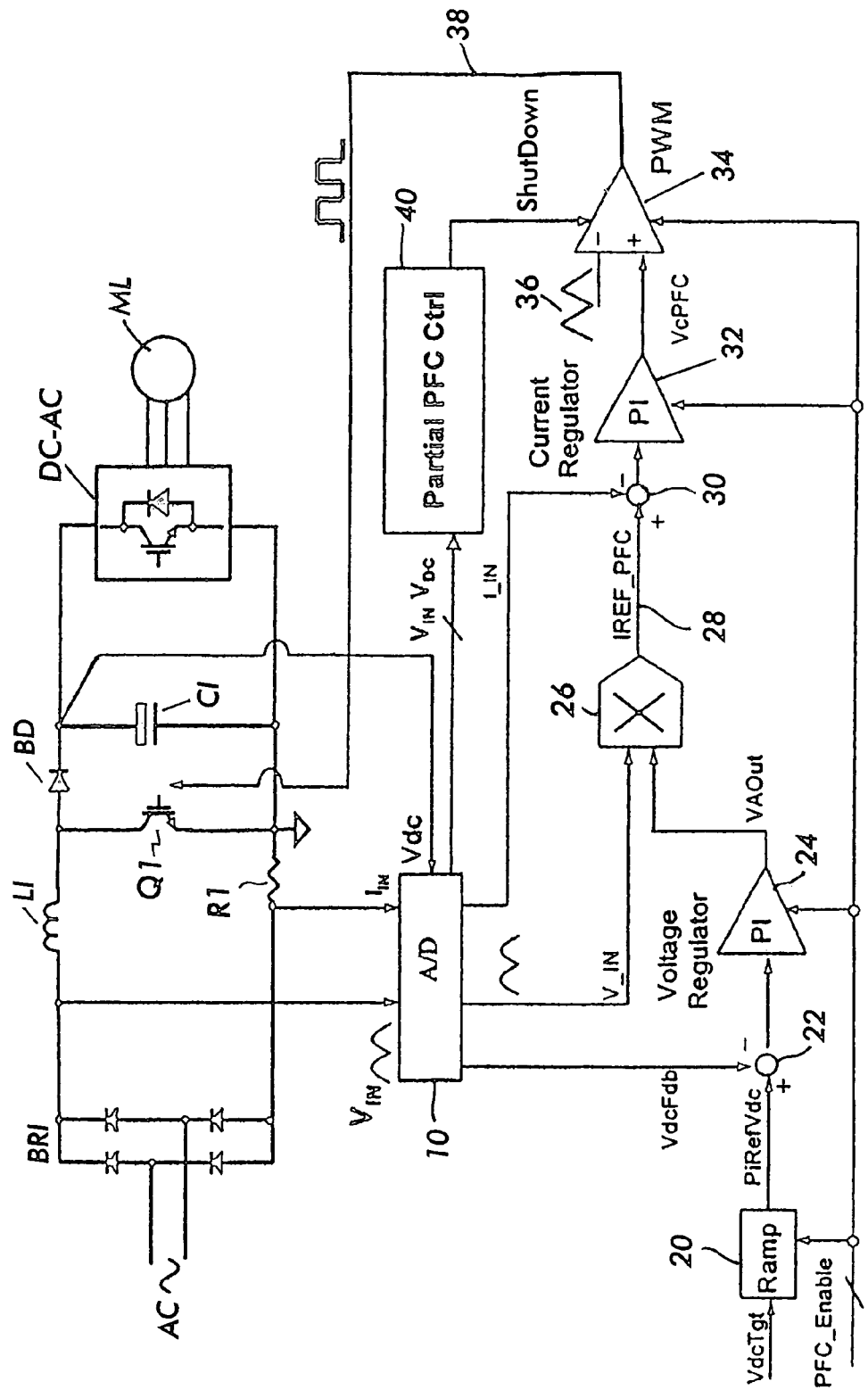
Figure 7:
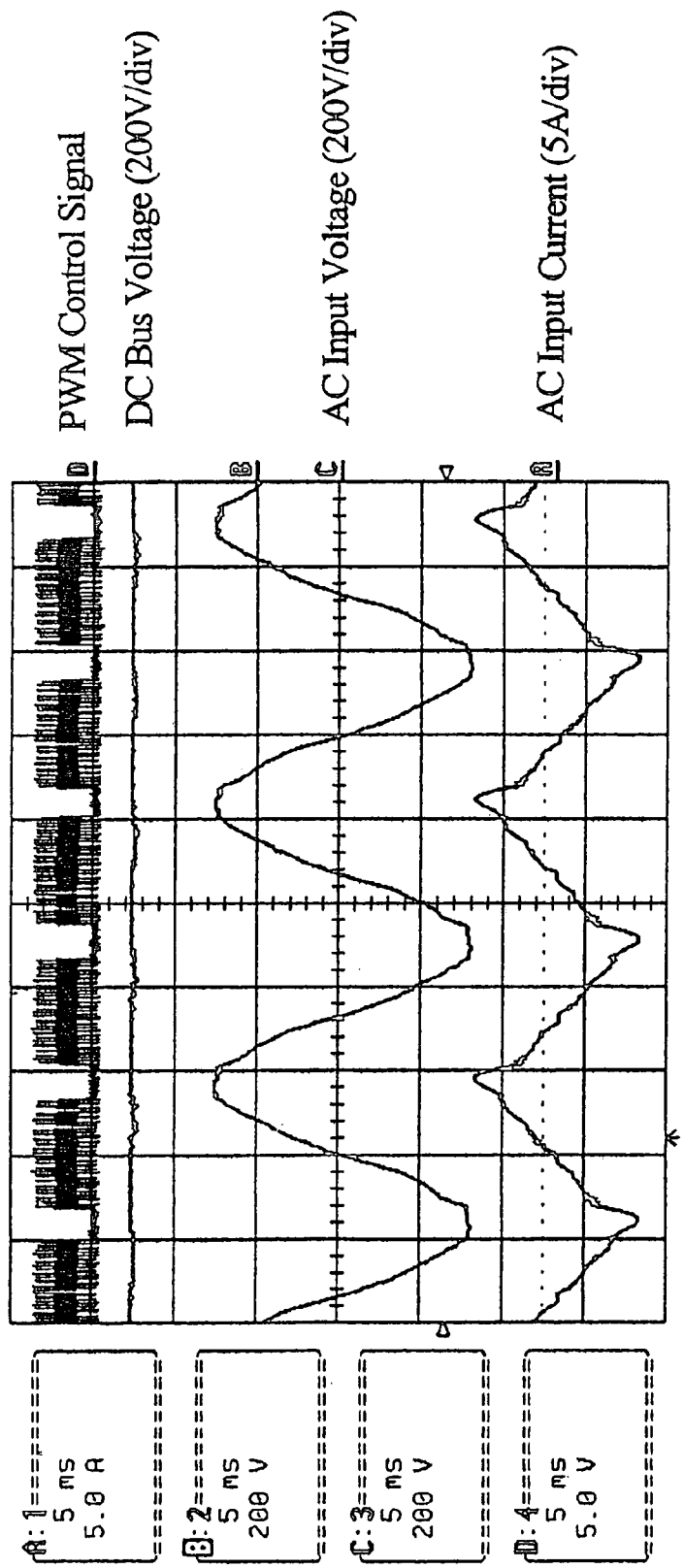

The invention will be now be described in greater detail in the following detailed description with reference to the drawings in which FIG. 1 shows a prior art passive PFC circuit;
FIG. 2 shows a prior art active PFC circuit;
FIG. 3 shows yet another active PFC circuit;
FIG. 4 shows waveforms in the circuit of FIG. 3;
FIG. 5 shows the high frequency partial PFC circuit according to the present invention;
FIG. 6 shows waveforms in the circuit of FIG. 5;
FIG. 7 shows further waveforms in the circuit of FIG. 5;
Other objects, features and advantages of the present invention will be apparent from the following detailed description.

DETAILED DESCRIPTION OF PREFERRED EMBODIMENTS OF THE INVENTION

With reference again to the drawings, FIG. 5 shows the PFC circuit according to the present invention. The circuit includes a bridge rectifier BR1 fed from the AC supply. The rectified AC is provided to the boost inductor L1. A PFC switch Q1 is coupled in series with the inductor and across the output of the bridge rectifier after the inductor. The boost diode BD is coupled in series with the inductor L1 and the output capacitor C1 is coupled at shown at the output of the boost converter circuit in known fashion. The voltage across the capacitor C1 comprises the DC bus voltage which is provided to a load which might comprise, for example a DC to AC inverter driving a three phase motor load ML, for example.

The output of the DC bus $V_{DC}$ is provided to an A to D converter 10 which has as inputs the DC bus voltage $V_{DC}$, the current $I_{IN}$ in the inductor L1 as sensed by a resistor RI or by other sensing means, as well as the rectified AC input voltage $V_{IN}$. The A to D converter produces three outputs comprising digital implementations of the DC bus voltage, VdcFdb, the input voltage $V_{IN}$ and the inductor current $V_{IN}$. Although a digital implementation is shown for the circuit, the circuit can also be implemented with analog components. $V_{IN}$ and $V_{DC}$ are also provided to a circuit 40, to be described below.

The circuit comprises a ramp generator 20 which receives a DC target voltage VdcTgt. The output of the ramp generator is provided to a difference circuit 22 in which the DC bus voltage is subtracted from the ramp voltage. This is fed to a voltage regulator which may comprise a PI controller 24. The output of the PI controller 24 is fed to a multiplier circuit 26 wherein the voltage output from the voltage regulator (PI controller) and the input voltage $V_{IN}$ are multiplied. This results in a reference PFC signal IREF_PFC 28, from which the inductor current is subtracted in a difference stage 30. The output of this difference stage 30 is fed to a current regulator 32 comprising a PI controller. The output of the controller 32 is fed to a comparator 34 wherein the PWM signal is generated by comparing an oscillator signal typically a ramp or sawtooth signal 36 generated by an oscillator with the output of the controller 32. This controls the duty cycle of the PWM signal provided to control the switch QI and thereby control the power factor correction.

A PFC enable signal is provided to blocks 20, 24, 32 and 34 to disable PFC operation from another circuit.

The described control circuit is substantially the conventional circuit as shown in FIG. 3. The voltage regulation loop of FIG. 3 comprises the components 20 and 24 wherein the DC bus voltage and the target voltage are compared to provide the voltage regulation control signal fed to the multiplier 26. The current loop includes the components 32 and the PWM comparator 34 whose output is coupled to control the switch Q1.

According to the invention, a partial PFC controller 40 is provided which is fed the control signals $V_{IN}$ and $V_{DC}$, preferably in digital form. It can also be implemented in analog form, within the concept of the invention. As before, $V_{IN}$ is the instantaneous rectified AC input voltage and $V_{DC}$ is the instantaneous DC bus voltage. Partial PFC control circuit 40 operates as follows. Circuit 40 compares the rectified AC input voltage $V_{IN}$ with the DC bus voltage $V_{DC}$. When the rectified AC input voltage is less than the DC bus voltage, partial PFC controller 40 provides a signal to the PWM comparator 34 to enable the PWM comparator, thereby providing PWM signals to control the on time of switch Q1. This is performed at a high frequency, for example 50 KHz as in the prior art. Due to the high bandwidth current loop, the input current is built up in the shape of a sinusoidal reference IREF_PFC which is generated by the voltage loop. When Vin is greater than Vdc, that is, when the rectified AC input voltage is greater than the DC input voltage, PWM switching of the switch Q1 is not necessary for many applications, and therefore the generation of PWM switching signals is disabled. Partial PFC controller 40 provides a shutdown signal to the PWM comparator 34 to disable PWM operation and accordingly switch Q1 is maintained in an off state. However, because the rectified AC input voltage is greater than the DC bus voltage, the bridge rectifier and the boost diode BD will continue to conduct and input current will flow continuously.

In this partial PFC operation, the closed loop control current is maintained during the period when the PWM switching is enabled and globally closed loop voltage loop control is maintained.

FIG. 6 shows the control timing of the high frequency partial PFC circuit of FIG. 5. FIG. 6 shows the rectified AC input voltage $V_{IN}$ and the DC bus voltage $V_{DC}$. As shown, when the rectified AC input voltage is greater than the DC bus voltage, the PWM switching is disabled. The PWM switching is enabled when the rectified AC input voltage is less than the DC bus voltage. FIG. 6 also shows the inductor current IN.

FIG. 7 shows signals in the circuit of FIG. 5 including the PWM control signal, DC bus voltage, the AC input voltage and the AC input current. As shown by the PWM control signal, when the rectified AC input voltage exceeds DC bus voltage, the PWM switching is disabled.

Table 1 compares the measured power factor THD (total harmonic distortion) and efficiency comparing a simple diode bridge rectifier circuit, the invented partial boost PFC circuit and the conventional full boost PFC circuit shown in FIG. 3. Major features of the circuit according to the invention are as follows: improved crest factor and THD in comparison with the bridge rectifier circuit.

Because the switching frequency is high when PWM switching is enabled, the PFC inductor size and costs are much less than the existing prior art solutions of FIGS. 1 and 2 where the PFC switching frequency is only at the line frequency.

TABLE 1

Comparison of Measured Power Factor and Efficiency

|  | Diode Bridge Rectifier | Invented Partial Boost PFC | Conventional Full Boost PFC |
| --- | --- | --- | --- |
| Vdc (V) | 295.8 | 308.5 | 307.5 |
| Vin_rms (V) | 231.8 | 224.3 | 192.3 |
| Input Power Pin (W) | 528 | 584 | 591 |
| Output Power Po (W) | 521 | 567 | 563 |
| Iin_peak (A) | 7.42 | 5.15 | 4.92 |
| Iin_rms (A) | 3.21 | 2.69 | 3.10 |
| Crest Factor | 2.31 | 1.91 | 1.59 |
| THD (%) | 90.66 | 19.03 | 8.26 |
| Power Factor | 0.710 | 0.967 | 0.991 |
| Efficiency (%) | 98.7 | 97.1 | 95.3 |

Because fewer switching events occur than in the conventional boost PFC shown in FIG. 3, there is less switching loss and noise. This can improve efficiency while achieving relatively good PFC performance.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A circuit for providing power factor correction comprising:

a boost converter circuit having a boost inductance and a power factor correction switch coupled in series with the boost inductance, the boost inductance and power factor correction switch being coupled across the output of a rectifier being supplied with AC power from an AC line, the boost converter circuit further comprising a boost diode coupled to a junction between the inductor and the switch, an output of the boost diode coupled to an output capacitor, a DC bus voltage being provided across the output capacitor, further comprising a control circuit receiving as inputs a rectified AC input voltage from the rectifier, a signal proportional to current through the inductor and the DC bus voltage across the capacitor, and wherein the control circuit provides a pulse width modulated signal to control the on time of the PFC switch, further comprising an enable/disable circuit receiving as inputs the rectified AC input voltage and the DC bus voltage, the circuit instantaneously comparing the rectified AC input voltage and the DC bus voltage and controlling the control circuit whereby the control circuit provides the pulse width modulated signal to control the PFC switch when the rectified AC input voltage is less than the DC bus voltage and disables the generation of the pulse width modulated signal to the PFC switch when the rectified AC input voltage is greater than DC bus voltage.

2. The circuit of claim 1, wherein the enable/disable circuit receives digital inputs or analog inputs comprising the rectified AC input voltage and the DC bus voltage from an A/D converter or from analog signal processing circuit and provides an enable/disable output to a PWM comparator of the control circuit.

3. The circuit of claim 2, wherein the control circuit comprises a voltage regulator loop receiving an input target voltage and the DC bus voltage and providing an error voltage output, and further comprising a current regulator receiving the error voltage output, the rectified AC input voltage and inductor current signal as inputs and providing an output signal to the PWM comparator.

4. A method for providing power factor correction in a boost converter circuit, wherein the boost converter circuit has a boost inductance and a power factor correction switch coupled in series with the boost inductance, the boost inductance and power factor correction switch being coupled across the output of a rectifier supplied with AC power from an AC line, the boost converter circuit further comprising a boost diode coupled to a junction between the inductor and the switch, an output of the boost diode coupled to an output capacitor, a DC bus voltage being provided across the output capacitor, further comprising a control circuit receiving as inputs a rectified AC input voltage from the rectifier, a signal proportional to current through the inductor and the DC bus voltage across the capacitor, and wherein the control circuit provides a pulse width modulated signal to control the on time of the PFC switch, the method comprising instantaneously comparing the rectified AC input voltage and the DC bus voltage and controlling the control circuit whereby the control circuit provides the pulse width modulated signal to control the PFC switch when the rectified AC input voltage is less than the DC bus voltage and disables the generation of the pulse width modulated signal to the PFC switch when the rectified AC input voltage is greater than DC bus voltage.

5. The method of claim 4, further comprising receiving digital inputs or analog inputs comprising the rectified AC input voltage and the DC bus voltage from an A/D converter or from analog signal processing circuit and providing an enable/disable output to a PWM comparator of the control circuit.

6. The method of claim 5, further comprising receiving an input target voltage and the DC bus voltage and providing an error voltage output, and further comprising receiving the error voltage output, the rectified AC voltage and inductor current signal as inputs and providing an output signal to the PWM comparator.

* * * * *

UNITED STATES PATENT AND TRADEMARK OFFICE
CERTIFICATE OF CORRECTION

PATENT NO. : 7,088,081 B2  
APPLICATION NO. : 11/165939  
DATED : August 8, 2006  
INVENTOR(S) : Toshio Takahashi and Yong Li It is certified that error appears in the above-identified patent and that said Letters Patent is hereby corrected as shown below:

On the title page, Item (75), change the first Inventor to:

--Toshio Takahashi, Rancho Palos Verdes, CA (US)--.

Signed and Sealed this

Fifth Day of December, 2006

JON W. DUDAS  
*Director of the United States Patent and Trademark Office*